Patented Oct. 4, 1932

1,880,970

UNITED STATES PATENT OFFICE

RUDOLF MÜLLER AND ERNST HONOLD, OF FRANKFORT-ON-THE-MAIN-FECHENHEIM, GERMANY, ASSIGNORS TO GENERAL ANILINE WORKS, INC., OF NEW YORK, N. Y., A CORPORATION OF DELAWARE

NEW ACID WOOL DYESTUFFS OF THE ANTHRAQUINONE SERIES AND PROCESS OF MAKING SAME

No Drawing. Application filed March 14, 1929, Serial No. 347,164, and in Germany March 17, 1928.

Our present invention relates to new acid wool dyestuffs of the anthraquinone series and to processes of preparing them.

We have found that valuable acid wool dyestuffs, useful also as parent materials for the manufacture of further dyestuffs, are obtained by causing the diazo-compound of an 1-amino-anthraquinone-2-sulfonic acid compound corresponding to the general formula:

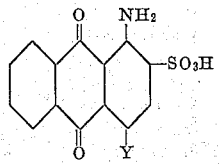

wherein Y means halogen, to react with a compound of the general formula:

wherein $R_1$ means hydrogen or an alkyl-group and $R_2$ an alkyl, cycloalkyl, aralkyl or a aryl-group. The reaction may be favorably influenced by the addition of a suitable catalyst as for instance copper, zinc, magnesium or a compound of these metals.

The reaction runs probably in such a way that at first diazo-amino compounds are formed which mainly decompose while delivering nitrogen. By this reaction of decomposition the substituents in the 1- and/or 4- position of the anthraquinone nucleus are probably replaced by substituted amino-groups. The exchange which takes place in these two positions occurs with a different facility. It varies according to the reaction conditions and to the compounds used as starting materials. Therefore it is possible to introduce a substituted amino-group at first into one of these positions, ordinarily into the 1-position, and then a further substituted amino-group, which may be different from the first one, into the other position. In the latter case dyestuffs are obtained which contain differently substituted amino-groups in their molecules. As starting material for our present process also 1-diazo-4-aryl amino-anthraquinone-2-sulfonic acid compounds may be used, in which a substituted amino group is already present in the 4-position.

As according to the above-mentioned assumption several reactions take place besides each other, the dyestuffs prepared by our process are generally mixtures of a few chemical compounds, which are difficult to be separated in consequence of the similarity of their properties.

Our process may be carried out by introducing the diazo-compound into an excess of the base. In order to moderate the great disengagement of heat which spontaneously occurs, an indifferent solvent, such as benzene or nitrobenzene, may advantageously be added in many cases. The process may also be effected in the presence of water e. g. by using a moist paste of the diazo-compound.

The new dyestuffs prepared by our process dye wool from an acid bath bluish to grey to black shades of a good fastness and levelling property.

Primary aromatic bases yield especially valuable dyestuffs which though being probably mixtures of several dyestuffs exhibit a good fastness and an excellent levelling property.

In order to further illustrate our invention the following examples are given, the parts being by weight and all temperatures in centigrade degrees; but we wish it to be understood that our invention is not limited to the examples given, nor to the exact conditions stated therein.

Example 1

The diazo compound, dried in the air, of 14 parts of 1-amino-4-bromo-anthraquinone-2-sulfonic acid is introduced at 0° to +5° during half an hour, while well cooling, into 30 parts of aniline mixed with 0.1 parts of copper powder. With a strong evolution of nitrogen and a great disengagement of heat the reaction mass becomes dark brown. In order to finish the reaction the temperature is allowed to arise to 30° and maintained there for some time. After the addition of alkali the excess of aniline is removed by means of steam. From the distillation residue, representing a blackish solution, the formed dyestuff is precipitated by addition of common salt. It is a black powder easily soluble in water, soluble in concentrated sulfuric acid to a feebly colored solution, which becomes intensely blue when mixed with para-formaldehyde. The dyeings on wool show neutral grey to black shades of a very good fastness.

*Example 2*

15 parts of 1-diazo-4-bromo-anthraquinone-2-sulfonic acid, dried in the air, are gradually added while stirring and cooling by ice to a suspension of 0.1 part of copper acetate in 40 parts hexahydro aniline. When the evolution of nitrogen has ceased, the reaction mass is further stirred at 40–50° for one hour. Then the dyestuff is isolated as described in Example 1. It dissolves in sulfuric acid to a nearly colorless solution and dyes wool from an acid bath reddish black shades of an excellent fastness.

When hexahydro aniline is replaced by another amine, such as ethyl amine or butyl amine, dyestuffs of substantially the same properties are obtained.

*Example 3*

15 parts of a water-containing paste corresponding to 9 parts of dry 1-diazo-4-bromo-anthraquinone-2-sulfonic acid are introduced into a mixture of 0.1 part of copper powder and 40 parts of aniline. The temperature is first maintained at 15–20° by cooling, then increased to about 25–30° until the evolution of nitrogen has ceased.

The mass is worked up as described in the foregoing examples. The dyestuff thus obtained corresponds as to its properties to that of Example 1.

A similar dyestuff is obtained by substituting the copper powder by another catalyst as, for instance, zinc. When no catalyst is applied to the mass, a dyestuff is formed which dissolves in concentrated sulfuric acid with a greenish tint and dyes wool dark blue shades.

*Example 4*

14 parts of the sodium salt of 1-amino-4-phenyl amino-anthraquinone-2-sulfonic acid are dissolved in water and diazotized at 10–15° by means of hydrochloric acid and 2.5 parts of sodium nitrite. The difficulty soluble diazonium compound is filtered off. It is introduced at room temperature, while cooling, into a mixture of 30 parts of aniline and 0.1 part of copper powder. The reaction is finished by warming the mass to 40° and the product is isolated as explained above. The dyestuff thus formed is substantially identical to that of Example 1.

Other bases, as para-toluidine, ortho-anisidine or mono-acetyl-diamino-benzene, used instead of aniline yield analogous dyestuffs.

*Example 5*

70 parts of moist 1-diazo-4-bromo-anthraquinone-2-sulfonic acid containing 39.3 parts of the dry diazo-compound are made into a paste with 400 parts of water. Then a solution of 11.2 parts of aniline in 40 parts of acetic acid of 50% strength is added. After stirring at 30–35° for 4–5 hours the diazoamino-compound now formed is filtered off and suspended in 500 parts of water. Into this suspension there are successively introduced at 20°, 15 parts of aniline, a solution of 1 part of copper sulfate in water and finally a solution of 15 parts of calcined soda in 150 parts of water. While strongly foaming the reaction mass spontaneously becomes warm and darkens quickly. It is then shortly warmed to 70–80° in order to finish the reaction. The excess of aniline is removed by means of steam, the remaining dyestuff solution is filtered and mixed with common salt. The dyestuff thus isolated is substantially identical with that described in Example 1.

When other acid-binding means, such as caustic alkalies, bicarbonates, sodium acetate or ammonia are used, analogous products are obtained according to the reaction conditions, showing besides other equal properties a somewhat more reddish or greenish shade as the dyestuff prepared according to Example 1.

By employing instead of the aniline used in the second stage according to this example, the corresponding amount of another base as, for instance, paratoluidine, a mixed dyestuff is obtained showing similar properties as that prepared from aniline alone.

*Example 6*

A moist paste of 20 parts of 1-diazo-4-bromo-anthraquinone-2-sulfonic acid is introduced into 100 parts of mono-ethyl-aniline and 0.4 parts of copper. When the evolution of nitrogen has ceased the mass is warmed for a short time and then worked up as described above. The dyestuff thus obtained dyes wool reddish grey shades and corresponds otherwise to the other dyestuffs of this kind.

We claim:

1. The process which comprises causing the diazo compound of an 1-amino-anthraquinone-2-sulfonic acid compound of the general formula:

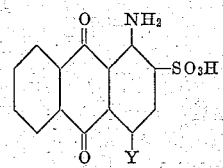

wherein Y means halogen, to react with a compound of the general formula:

wherein $R_1$ means hydrogen or an alkyl group, and $R_2$ an alkyl, cycloalkyl, aralkyl or an aryl group, in the presence of a metal-containing catalyst and of an indifferent diluent.

2. The process which comprises causing the diazo compound of an 1-amino-anthraquinone-2-sulfonic acid compound of the general formula:

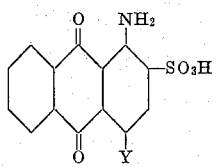

wherein Y means halogen, to react with a compound of the general formula:

wherein $R_1$ means hydrogen or an alkyl group, and $R_2$ an alkyl, cycloalkyl, aralkyl or an aryl group, in the presence of a metal-containing catalyst.

3. The process which comprises causing the diazo compound of an 1-amino-anthraquinone-2-sulfonic acid compound of the general formula:

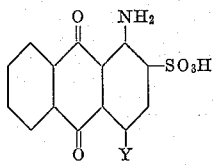

wherein Y means halogen, to react with a compound of the general formula:

wherein $R_1$ means hydrogen or an alkyl group and $R_2$ an alkyl, cycloalkyl, aralkyl or an aryl group, in the presence of copper.

4. The process which comprises causing the diazo compound of an 1-amino-anthraquinone-2-sulfonic acid compound of the general formula:

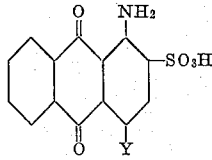

wherein Y means halogen, to react with an excess of a compound of the general formula:

wherein $R_1$ means hydrogen or an alkyl group and $R_2$ an alkyl, cycloalkyl, aralkyl or an aryl group.

5. The process which comprises causing the diazo compound of an 1-amino-anthraquinone-2-sulfonic acid of the formula:

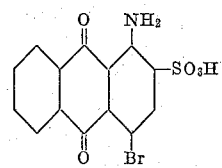

to react with an excess of aniline in the presence of copper.

6. As new products, the acid wool dyestuffs obtainable by causing the diazo compound on an 1-amino-anthraquinone-2-sulfonic acid compound of the general formula:

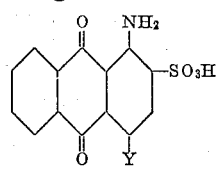

wherein Y means halogen, to react with an excess of a compound of the general formula:

wherein $R_1$ means hydrogen or an alkyl group and $R_2$ an alkyl, cycloalkyl, aralkyl or an aryl group, in the presence of a metal-containing catalyst and of an indifferent diluent, which products are dark-colored powders, easily soluble in water, soluble in sulfuric acid to feebly colored solutions, dyeing wool from an acid bath bluish to grey to black shades of a very good fastness and levelling property.

7. As new products, the acid wool dyestuffs obtainable by causing the diazo compound of an 1-amino-anthraquinone-2-sulfonic acid compound of the general formula:

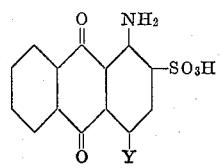

wherein Y means halogen, to react with an excess of a compound of the general formula:

wherein $R_1$ means hydrogen or an alkyl group and $R_2$ an alkyl, cycloalkyl, aralkyl or an aryl group, which products are dark-colored powders, easily soluble in water, soluble in sulfuric acid to feebly colored solutions, dyeing wool from an acid bath bluish to grey to black shades of a very good fastness and levelling property.

8. As a new product, the acid wool dyestuff obtainable by causing the diazo compound of 1-amino-4-bromo-anthraquinone-2-sulfonic acid of the formula:

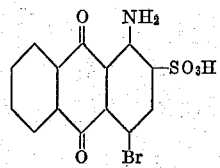

to react with an excess of aniline in the presence of copper, which product is a black powder, easily soluble in water, soluble in sulfuric acid to a feebly colored solution becoming intensely blue when mixed with para-formaldehyde, dyeing wool from an acid bath neutral grey to black shades of a very good fastness and levelling property.

In testimony whereof, we affix our signatures.

RUDOLF MÜLLER.
ERNST HONOLD.